US009355080B2

(12) United States Patent
Zheng et al.

(10) Patent No.: US 9,355,080 B2
(45) Date of Patent: May 31, 2016

(54) PROPAGATING USER FEEDBACK ON SHARED POSTS

(71) Applicant: GOOGLE INC., Mountain View, CA (US)

(72) Inventors: Lantian Zheng, San Jose, CA (US); Zhi Weng, San Jose, CA (US)

(73) Assignee: GOOGLE INC., Mountain View, CA (US)

( * ) Notice: Subject to any disclaimer, the term of this patent is extended or adjusted under 35 U.S.C. 154(b) by 225 days.

(21) Appl. No.: 14/261,015

(22) Filed: Apr. 24, 2014

(65) Prior Publication Data

US 2014/0223289 A1 Aug. 7, 2014

Related U.S. Application Data

(63) Continuation of application No. 13/414,489, filed on Mar. 7, 2012, now abandoned.

(51) Int. Cl.
| | |
|---|---|
| G06F 3/048 | (2013.01) |
| G06F 17/22 | (2006.01) |
| H04L 12/58 | (2006.01) |
| G06F 17/30 | (2006.01) |
| G06Q 50/00 | (2012.01) |

(52) U.S. Cl.
CPC ...... *G06F 17/2247* (2013.01); *G06F 17/30861* (2013.01); *G06Q 50/01* (2013.01); *H04L 51/16* (2013.01)

(58) Field of Classification Search
CPC .................................. G06Q 50/01; H04L 51/16
See application file for complete search history.

(56) References Cited

U.S. PATENT DOCUMENTS

| | | | |
|---|---|---|---|
| 2008/0256233 A1 | 10/2008 | Hall et al. | |
| 2009/0228486 A1* | 9/2009 | Kuehr-McLaren | ... G06F 17/389 |
| 2010/0217670 A1 | 8/2010 | Reis et al. | |
| 2011/0258560 A1 | 10/2011 | Mercuri et al. | |

(Continued)

FOREIGN PATENT DOCUMENTS

| | | |
|---|---|---|
| JP | 2006-244305 A | 9/2006 |
| KR | 10-2005-0112476 A | 11/2005 |

(Continued)

OTHER PUBLICATIONS

International Search Report and Written Opinion of PCT/US2013/026191, KIPO, Jun. 21, 2013, 14 pgs.

(Continued)

*Primary Examiner* — Scott Baderman
*Assistant Examiner* — Asher Kells
(74) *Attorney, Agent, or Firm* — Procopio, Cory, Hargreaves & Savitch LLP

(57) ABSTRACT

Propagating user feedback on shared posts is described, including receiving a user indication associated with repost content. The repost content is associated with post content. The post content includes at least one item provided on a website. The repost content includes at least one other item provided on another website or the website, and the at least one other item is associated with the at least one item. The repost content is determined to be associated with the post content. Post feedback data based on the user indication is identified. The post feedback data is associated with the post content, and the post feedback data represents previous user indication. The post feedback data is updated based on the user indication.

26 Claims, 5 Drawing Sheets

(56) References Cited

U.S. PATENT DOCUMENTS

| | | |
|---|---|---|
| 2011/0265011 A1 | 10/2011 | Taylor et al. |
| 2012/0150833 A1 | 6/2012 | Parthasarathy et al. |
| 2012/0151383 A1 | 6/2012 | Kazan et al. |
| 2012/0158753 A1* | 6/2012 | He .................. G06F 17/30867 707/752 |
| 2012/0173508 A1* | 7/2012 | Zhou ................. G06F 17/30864 707/709 |
| 2012/0317309 A1* | 12/2012 | Benco ................. H04L 67/1095 709/248 |
| 2014/0040387 A1* | 2/2014 | Spivack .............. G06F 17/3053 709/206 |

FOREIGN PATENT DOCUMENTS

| | | |
|---|---|---|
| KR | 10-2008-0083079 A | 9/2008 |
| KR | 10-0861799 B1 | 10/2008 |

OTHER PUBLICATIONS

"Google +1 Button" downloaded from http://www.google.com/+1/button/ on Feb. 29, 2012.

"LikeMyTweets—Like Button for Twitter," downloaded from http://www.likemytweets.com/ on Feb. 29, 2012.

"Facebook for Websites," downloaded from http://developers.facebook.com/docs/guides/web on Feb. 29, 2012.

* cited by examiner

PROPAGATING USER FEEDBACK ON SHARED POSTS

CROSS-REFERENCE TO RELATED APPLICATIONS

This application is a continuation of U.S. application Ser. No. 13/414,489, filed Mar. 7, 2012, claiming priority under 35 USC 120, the contents of which is incorporated by reference in its entirety.

BACKGROUND

Background Information

The discussion below relates generally to online communications or social networks and, more particularly, to propagating user feedback on shared posts.

Related Technology

A social network or social networking service is an online platform or website that provides services focusing on reflecting relationships among users. For example, users on a social network can establish "circles" of relationships (e.g., family members and friends in one circle, hiking buddies or users having similar interest or hobby in another circle, professional acquaintances in a third circle, etc.). A user on a social network can share with other users on that social network (e.g., a circle of users, a set of friends, etc.) many types of information, content, or posts.

Content shared from one user to another user (first-level receiver) can be reposted or re-shared by the first-level receiver to more users (second-level receivers). These additional users may further re-share the content downstream to other users (third-, fourth-, or higher-level receivers). Recipients of the posts or reposts on any level can re-share the received content. However, the original poster or upstream users are unaware of the content being re-shared more than one level downstream, and therefore are unaware of the popularity of the content.

A solution without the above limitations is needed.

SUMMARY

Propagating user feedback on shared posts is described. The subject matter includes a method for receiving a user indication associated with repost content. The repost content is associated with post content. The post content includes at least one item provided on a website. The repost content includes at least one other item provided on another website or the website, and the at least one other item is associated with the at least one item. The repost content is determined to be associated with the post content. Post feedback data based on the user indication is identified. The post feedback data is associated with the post content, and the post feedback data represents previous user indication. The post feedback data is updated based on the user indication.

According to an example embodiment, the post feedback data is provided on the website.

According to an example embodiment, a repost includes at least a portion of a post. The post is posted by a first user, the repost is posted by a second user, and the user indication is received from a third user.

According to an example embodiment, a post is provided on one part of the website. A repost, which includes a least a portion of the post, is provided on another part of the website or on another website.

According to an example embodiment, a post and a repost form a tree structure, with the post being a parent or grandparent of the repost; the post is at the root of the tree structure.

According to an example embodiment, a user indication is propagated up the tree structure to a level where the post content resides. Previous user indications include aggregation of user indications associated with at least one of the post content and at least one repost content at one or more levels lower than the level where the post content resides.

According to an example embodiment, a user indication is of one of a plurality of types of user indications. Each of the plurality of types of user indications is associated with a corresponding one of a plurality of post feedback data associated with a post. The post feedback data is identified based on the user indication. The identifying includes identifying the one of the plurality of types of user indications, and identifying the post feedback data as one of the plurality of post feedback data corresponding to the identified one of the plurality of types of user indications.

According to an example embodiment, the user indication includes an indication associated with activating a "+1" control.

According to an example embodiment, the user indication includes an indication associated with activating a "Share" control or "Comment" control.

An example embodiment includes storing an association of the post content and the repost content; the association identifies the post content associated with the repost content.

According to an example embodiment, the post feedback data is numerical data, the user indication is represented by a numeric value, and updating the post feedback data includes adding the numeric value to the post feedback data.

An example embodiment includes determining a type of comment data, which are included with the repost content; and the updating the feedback data is performed if the type of comment data is of a positive type.

According to an example embodiment, the determining the type of the comment data includes using a natural language processing algorithm to process the comment data.

According to an example embodiment, the determining the type of the comment data includes matching the comment data with at least one text string.

An example embodiment further includes updating a source data to incorporate an identity of a user provided the user indication; the source data is associated with the feedback data.

An example embodiment includes determining a privacy setting, and the updating of the source data is based on the privacy setting.

According to an example embodiment, the updating the post feedback data is performed based on determining a user setting allowing the updating, and the user indication and the user setting are associated with the same user.

The subject matter includes a non-transitory computer readable medium having stored therein computer executable instructions for receiving a user indication associated with repost content. The repost content is associated with post content. The post content includes at least one item provided on a website. The repost content includes at least one other item provided on another website or the website, and the at least one other item is associated with the at least one item. The repost content is determined to be associated with the post content. Post feedback data based on the user indication is identified. The post feedback data is associated with the post content, and the post feedback data represents previous user indication. The post feedback data is updated based on the user indication.

The subject matter includes at least one computing device collectively having storage and at least one processor configured to receive a user indication associated with repost content. The repost content is associated with post content. The post content includes at least one item provided on a website. The repost content includes at least one other item provided on another website or the website, and the at least one other item is associated with the at least one item. The repost content is determined to be associated with the post content. Post feedback data based on the user indication is identified. The post feedback data is associated with the post content, and the post feedback data represents previous user indication. The post feedback data is updated based on the user indication.

The subject matter includes a computer-implemented method that includes receiving input indicating selection of a user interface (UI) element, wherein the UI element is associated with a second UI element representing a repost, identifying a post associated with the repost, wherein the repost includes at least a portion of the post, a link to access the post, or both, updating feedback associated with the post based on the input, and providing a third UI element representing the feedback and a fourth UI element representing the post.

An example embodiment includes determining that the repost further comprises a comment, and determining a type of the comment, wherein the updating is not performed if the type is not a positive type.

An example embodiment includes determining a privacy setting configured to affect updating a feedback source; the feedback source is updated to include an identity associated with the input if the privacy setting contains a value. Further, wherein the feedback source is not updated if the privacy setting does not contain the value.

An example embodiment includes a fifth UI element associated with the third UI element; the fifth UI element is configured to trigger a presentation of additional information associated with the feedback.

According to an example embodiment a list of identities of users who have provided the feedback is provided. The list of identities is triggered by the activation of the fifth UI element.

DETAILED DESCRIPTION

Introduction

The subject matter described herein is taught by way of example embodiments. Various details have been omitted for the sake of clarity and to avoid obscuring the subject matter.

Examples shown below are directed to structures and functions for implementing propagating user feedback on shared posts to upstream posts, including original posts. For example, an endorsement or comment (e.g., feedback) on a repost can be propagated, regardless of how many levels away, to an upstream post. Propagating feedback upstream may promote more sharing or re-sharing of content.

Users who produce, post, share content on various social networks, blogs, information sharing sites, or the Internet may appreciate feedback on the content they posted or reposted. Users who receive shared content, regardless of how many levels they may be downstream from the users who share the content, may provide comments or otherwise provide feedback on the content. One or more types of feedback (including, but not limited to, positive, negative, neutral, and general feedback) can be included, collected, or gathered to provide, channel, or propagate to the posters. In some situations, positive feedback may help direct credit to the poster and encourage further content creation, posting, and sharing.

Example Presentation of Services

Figure 1:
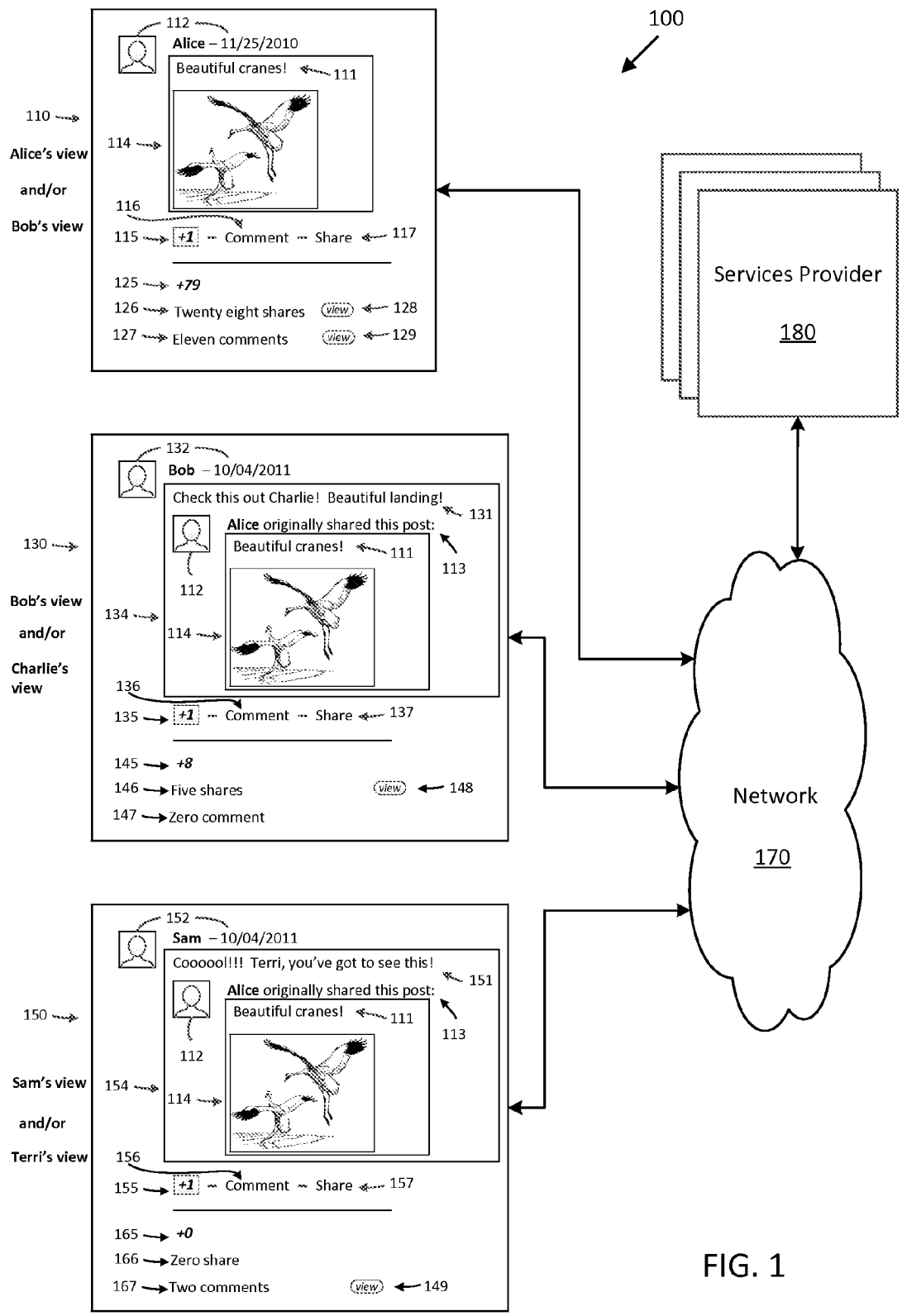
FIG. 1 shows example services and presentation of services.

FIG. 1 shows example services and presentation of services. An example environment 100 allows a user to produce or share content with other users. The environment 100 includes, for example, displays 110, 130, and 150, which may be at different points along a timeline. The computing devices (not pictured), coupled to displays 110, 130, and 150, and services provider 180 are communicatively connected to network 170, for example. Displays 110, 130, and 150 show services from services provider 180. For example, services provider 180 may provide services or a website (e.g., social network), and displays 110, 130, and 150 may be displaying items provided on the social network. Displays 110, 130, and 150 may also be referred to as views 110, 130, and 150.

In an example embodiment, Alice, shown using display 110, may post content 114 (Alice's post) to one of Alice's circle of users that may include Bob. Display 110 may illustrate a view similar to those seen by Alice and Bob. Display 110 includes Alice's information 112, her post 114, controls 115-117, feedback data 125-127, and feedback data controls 128 and 129.

Alice's information 112 may include a thumbnail image (e.g., of her face or of any subject) and her identifier "Alice" (e.g., name, alias, nickname, pseudonym, or the like). In some example embodiments, information 112 may include other information (e.g., the date of her post 114). In some example embodiments, Alice's information 112 may include less, more, or different information. Her post 114 may include any content or combination of content such as an image or a link to an image (e.g., the image of two cranes). There may be different or other content (not shown), such as a description of the image. In some example embodiments, post 114 may include a comment 111 from Alice, made at the time of or after posting the image of two cranes.

Feedback data can be provided using one or more controls 115-117. For example, in Alice's view 110, Alice may see post 114 that she has shared (e.g., with one of Alice's circle) and may use controls 115-117 to "+1", comment on, and/or share post 114 with another one of Alice's circles. The "+1" control, object, or link is a shorthand for users to endorse Alice's post 114, or otherwise express likeness, appreciation, a vote, or the like to Alice's effort and post 114.

Feedback data 125-127 shows the feedback from users using controls similar to controls 115-117. For example, feedback data 125 shows that her post 114 has attracted 79 clicks on the "+1" control, feedback data 126 shows that her post 114 has been shared 28 times, and feedback data 127 shows that her post 114 has received 11 comments. Feedback data controls 128 and 129 allow Alice to view, for example, who has shared her post 114 and who has commented on her post 114. In some example embodiments, one or more of feedback data 125-127 can serve as feedback data controls. For example, clicking on feedback data 125 will trigger a display of a list of identities of users who have provided feedback using the "+1" control.

Bob's display may present a view similar to Alice's view 110, Charlie's view 130, or a different view (not shown). Bob, who received Alice's original post 114, may share the post (e.g., repost Alice's post 114) with one of Bob's circles of users, which may include Charlie. Bob shares post 114 by, for example, activating a "Share" control 117 or 137. The post shared by Bob is shown as repost 134. In the process of or after sharing post 114, Bob may, for example, add a comment "Check this out Charlie! Beautiful landing!" 131.

Display 130 shows, for example, Charlie's view, including Bob's information 132, his post 134, which is a repost containing Alice's information 112, her post 114, and repost information 113, which indicates that post 134 is a repost of Alice's post 114. Charlie has access to controls 135-137, feedback data 145-147, and feedback data controls 148. When Charlie selects the "+1" control (e.g., clicks on control 135), feedback data 145, which may include feedback from other users (e.g., users in Bob's circle and/or downstream users), may change, for example, from "8" to "9" to include Charlie's feedback.

Display 150 illustrates that a post or repost can be shared with users any number of levels downstream, such as five, 10, 20, 32, 143, or more. Display 150 shows, for example, Sam re-sharing Alice's post 114 with Terri. Sam may be, for example, more than 20 levels downstream from Alice, Charlie, Bob, or another user who receives Alice's post 114, directly from Alice or indirectly via re-sharing. Display 150 shows Sam's information 152, his post 154, which is a repost containing Alice's information 112, her post 114, and repost information 113, which indicates that post 154 is a repost of Alice's post 114. In some example embodiments, post 154 may include a comment 151 from Sam, made at the time of or after reposting Alice's post 114. Terri has access to controls 155-157, feedback data 165-167, and feedback data controls 169. When Terri activates the "+1" control (e.g., double-clicks or hovers a mouse over control 155 for a time period such as, but is not limited to, one second), feedback data 165, which may include feedback from other users (e.g., users in Sam's circle and/or downstream users), may change, for example, from "0" to "1" to include Terri's feedback.

According to one example embodiment, there can be any number of types of feedback. For example, three types are illustrated in environment 100. In addition to a positive endorsement type of feedback, which may be provided via a "+1" control and the like, environment 100 shows a comment type of feedback and a share type of feedback. In some example embodiments, negative feedback (e.g., an expression of a dislike) may be provided. Using a "Comment" control 116, 136, or 156, a user may provide a comment as a feedback. For example, referring to view 110, Bob may provide a comment to Alice's post 114 using control 116. Referring to view 130, Bob may provide a comment to his repost 134 using control 136. A user may provide a comment, in one example, by activating a "Comment" control 116, 136, or 156 (e.g., clicking on it) then inputting a comment to a pop-up text box or other input widget or mechanism (e.g., selecting a comment from a list of comments). Feedback data 127, 147, or 167 shows comment feedback.

In some examples, a user may share or re-share content by activating a "Share" control 117, 137, or 157. A mechanism (not shown) may be provided to configure what is being shared. For example, the mechanism may allow a user to add a statement (e.g., "Check this out Charlie! Beautiful landing!" 131), select a content portion to share, and/or choose to share a link in place of or in addition to the content, etc. In the example of environment 100, sharing content produces share feedback data. Feedback data 126, 146, or 166 shows share feedback (e.g., the number of times a post or repost has been shared).

Services provider 180 may provide any computing services and may be implemented using any number of computing devices. Services provider 180 may provide, for example, social networking services or websites. In some examples, one computing device may implement all the services. In other examples, two, three, five, 12, 28, 150, 2472, or more computing devices collectively provide the services described herein. A computing device (e.g., computing device 605, FIG. 10) may be referred to as a server, a client, a system, or by another label. For simplicity, services provider 180 is used in describing the subject matter herein. It should be understood by people who are familiar with this field that a function, a service, any number of functions, or any number of services provided by services provider 180 can be implemented using one or more computing devices, in any configuration and division of the functions or services, and using any structure. Services provider 180 is further described in FIG. 2 below.

Definitions

As used herein, the term "post" (verb) or "share" (verb) refers to putting original content or non-original content on an online platform, site, or website. The same term "post" (verb) or "share" (verb) may also refer to putting a posted or shared content on an online platform, site, or website, which may or may not be the same platform where the posted or shared content is found.

As used herein, the term "repost" (verb) or "re-share" (verb) refers to putting a posted or shared content on an online platform, site, or website, which may or may not be the same platform where the posted or shared content is found.

As used herein, the term "post" (noun) or "repost" (noun) refers to content that has been posted, reposted, shared, or re-shared. Content that has been posted, reposted, shared, or re-shared (Content 1) can be further posted, reposted, shared, or re-shared with more users (Content 2). Content 2 may or may not be the same as Content 2. For example, Content 2 may be a link to Content 1. Content 2 may include additional information, e.g., annotation or comments, not found in Content 1. Content 2 may include only part of Content 1.

As used herein, the term "content," with respect to a post or repost, refers to any data or information that can be posted or shared on an online platform, site, or website. Examples of "content" may include, but are not limited to, any literal expression (e.g., a writing, document, information, comment, suggestion, recommendation, webpage, or the like) and any artistic expression in any medium (e.g., any writing, images, video, audio), any part thereof, any combination thereof (e.g., provided in a webpage), and any representation thereof (e.g., a link, an audio representation, and a visual representation of any literal and/or artistic expression).

As used herein, the term "website" or "web site" or "site" refers to a set of web pages for providing or supporting related services. A website can be hosted on at least one computing device (e.g., a system, server, web server, application server, client, or any label) accessible via a network or connection (wired and/or wireless). A website can be accessed and/or supported using at least one top-level Uniform Resource Locator (URL, e.g., "abc.gov", "123.org", "zxc.com", "bestads.com", "virtualbank.com", and the like). A website can be operated and/or supported by one or more business entities. For example, ZXC Corporation may operate the website "zxc.com" that includes web pages, content, and/or services from "zxc.bestads.com" (e.g., advertisement services provided by another firm) and "virtualbank.com/zxc-payment-services" (e.g., financial services provided by a financial institution).

Example Processes

Figure 2:
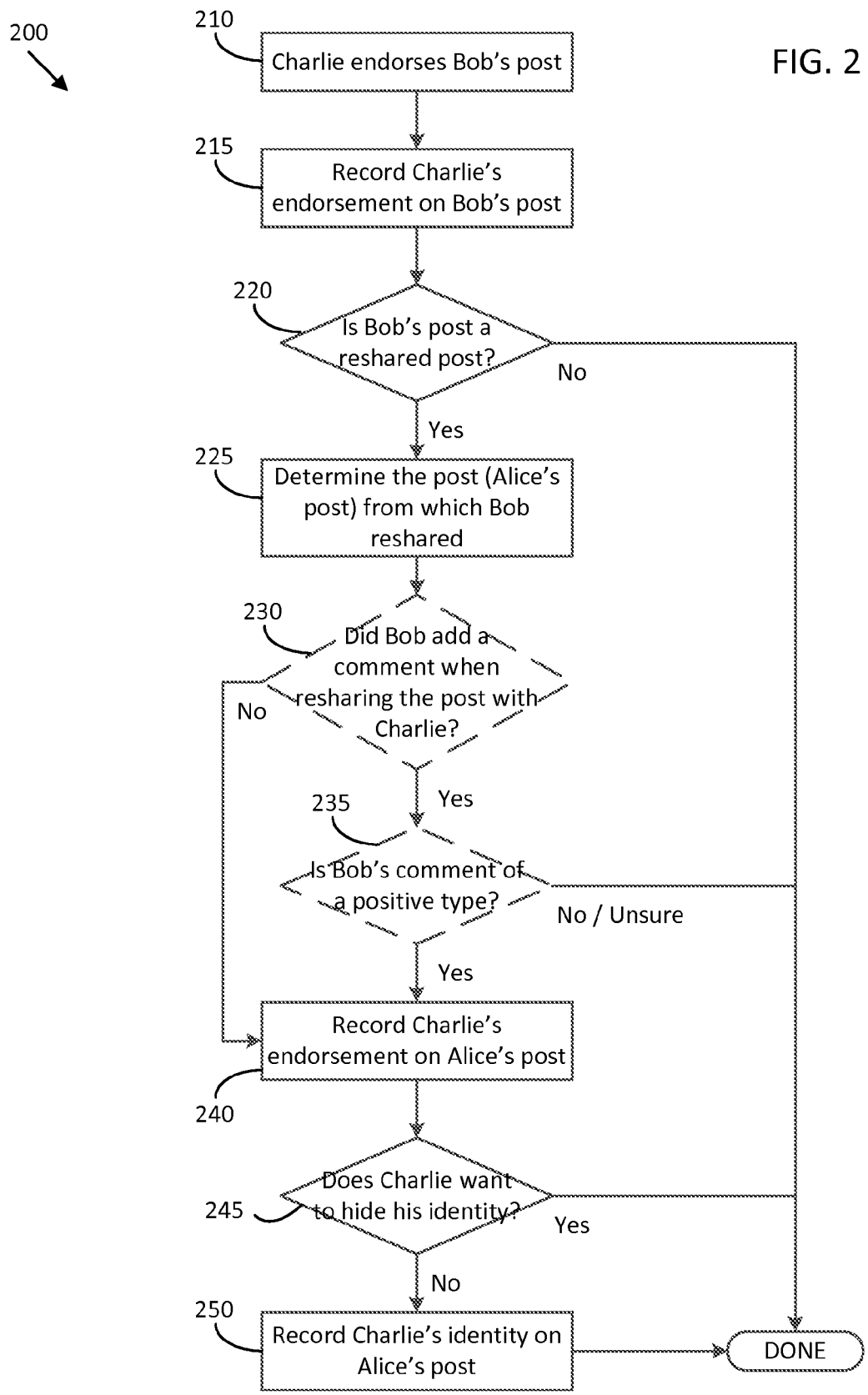
FIG. 2 illustrates an example of a processing flow.

FIG. 2 illustrates an example of a processing flow. Process 200 may show a process of services provider 180. Process 200 is described in conjunction with view 130 (FIG. 1), which may represent both Bob's view and Charlie's view. At 210, Charlie endorses Bob's post 134 by activating the "+1" control 135, which generates and transmits a user indication to services provider 180. At 215, services provider 180 updates and records Charlie's endorsement on Bob's post 134, which is reflected by changing feedback data 145 from "+8" to "+9" (not shown).

At 220, services provider 180 determines whether Bob's post 134 is a repost (or an original post). If the result of 220 is "no," Bob's post is not a re-shared post, but is instead an original post, and thus, process 200 ends. If the result of 220 is "yes," process 200 flows to 225. In one example, a repost of a post may include an association field storing information relating to the post. If the post is a repost (determined at block 220), at 225, services provider 180 detects, determines, or identifies that this field exists or is not empty, which indicates that Bob's post 134 is a repost of Alice's post 114. In other examples, determining the post associated with a repost may be performed differently, such as by looking for the upstream poster's information 112 or repost information 113.

At 230, services provider 180 processes Bob's information 132 to determine whether a comment was entered with a repost (e.g., if there is data in a comment field for comment 131 or 151). Note that a comment provided by a user sharing or re-sharing a post (e.g., comment 131 or 151) is different from a comment provided by a recipient of a post of repost (e.g., comment provided using control 116, 136, or 156). Processing flows to 240 if Bob did not enter a comment. If there is a comment (e.g., comment 131) and its type is determined, at 235, to be negative or unsure, process 200 ends. If the comment type is positive, services provider 180 updates and records Charlie's endorsement on Alice's post 114, which is reflected by changing feedback data 125 from "+79" to "80" (not shown), for example. In some example embodiments, process 200 does not include blocks 230 and 235, and process 200 flows from 225 to 240 (not shown).

Services provider 180 identifies which feedback data (e.g., post feedback data) 125-127 in Alice's view 110 to update based on the user indication. In this example, the user indication is generated using a "+1" control (e.g., control 135), and services provider 180 identifies that post feedback data 125 is associated with a "+1" control.

The content and type of Bob's comment (e.g., "Check this out Charlie! Beautiful landing!" 131) can be determined differently in different example embodiments. In some example embodiments, Bob's comment is matched against known phrases, such as "worth reading", "interesting", "good point", "good post", and the like that convey a similar connotation (e.g., a positive one). In other example embodiments, Bob's comment can be processed using one or more natural language processing algorithms. After determining that Bob's comment is of a positive type, for example, Charlie's "+1" feedback to Bob's post 134 is propagated and recorded to Alice's post 114. Propagating Charlie's feedback causes feedback data 125 in display 110 to change, for example, from "+79" to "+80" (not shown). Feedback data 125 shows previous feedback from users who have received Alice's post 114 and users who have received post 114 as reposts (e.g., reposts 134 and 154).

In some example embodiments, information about the sharing of a repost and comments to a repost (e.g., repost 134) are propagated to an upstream post (e.g., post 114). In these example embodiments, feedback data 126 and 127, respectively, in display 110 may be updated to include the feedback provided using, for example, the "Share" 137 and "Comment" 136 controls associated with repost 134 (display 130).

In some example embodiments, identities of the users who have provided feedback are propagated upstream along with their feedback. For example, when Charlie's "+1" feedback is propagated to feedback data 125 (described above), Charlie's identity is also propagated. Feedback data 125, which can function as a control to show who has provided the feedback, can be clicked on to reveal Charlie's identity along with the identities of those who have provided feedback (not shown in FIG. 1). For share feedback, for example, when feedback data control 128 is used, a list of users (not shown in FIG. 1) who have shared (e.g., reposted) post 114 can be revealed. Similarly, feedback data control 129 may trigger the display of users who have commented on post 114 or repost 134.

In some example embodiments, users are given a mechanism to control their privacy or propagation of their feedback and/or identities. In these example embodiments, a user, such as Charlie, can indicate (e.g., through one or more settings or controls) that he does not want his identity to be propagated with his feedback. When services provider 180 propagates Charlie's feedback, his privacy settings are checked at 245. If the privacy settings indicate that Charlie's identity information is set to "hidden," Charlie's identity information is not propagated along with his feedback, and process 200 ends. As such, activating any of the feedback data controls (e.g., controls 128 and 129) may show only the identities of other users who have provided feedback but have not indicated hiding their identities. Charlie's identity, however, will not be shown according to his privacy settings. If Charlie has not indicated that he wants to hide his identity, Charlie's identity is propagated and recorded on Alice's post 114 at 250.

Process 200 is illustrated above using "+1" feedback and the corresponding feedback data 125, 145, and 165. Additionally, the same or a different process may be used to process "Comment" and/or "Share" feedback. For example, at 210, Charlie may comment on or share Bob's post 134 (e.g., using controls 136 and 137, respectively). At 215, Charlie's comment and share indication is recorded on Bob's post (e.g., feedback data 146-147). There may be little or no processing deviation at 220 and 225. Further, 230 may be omitted and 235 may be applied to Charlie's comment feedback or omitted. At 240, Charlie's comment or share indication may be recorded on Alice's post 114. Charlie's privacy settings affect the processing at 245 and 250 as described above.

In some example embodiments, a user can indicate using one or more settings that he does not want his feedback to propagate (e.g., recording feedback only to the current post).

In some example embodiments, an in-between user (e.g., Bob in the user stream example of Alice-Bob-Charlie) may be given one or more settings to control information flowing through the in-between user. For example, feedback on reposts will only be propagated through Bob upstream if the Bob has opted-into allowing such data sharing. In other example embodiments, such data sharing will be shared unless Bob opts out.

In some example embodiments, an in-between user (e.g., Bob) may configure to only allow feedback to be populated from a downstream user, through Bob, to an upstream user if the downstream and upstream users are within a certain number of levels or social "steps" of each other. (e.g., Charlie through Bob to Alice might be two levels or steps). In other example embodiments, there may not be any level restriction.

Example Tree Representations

Figure 3:
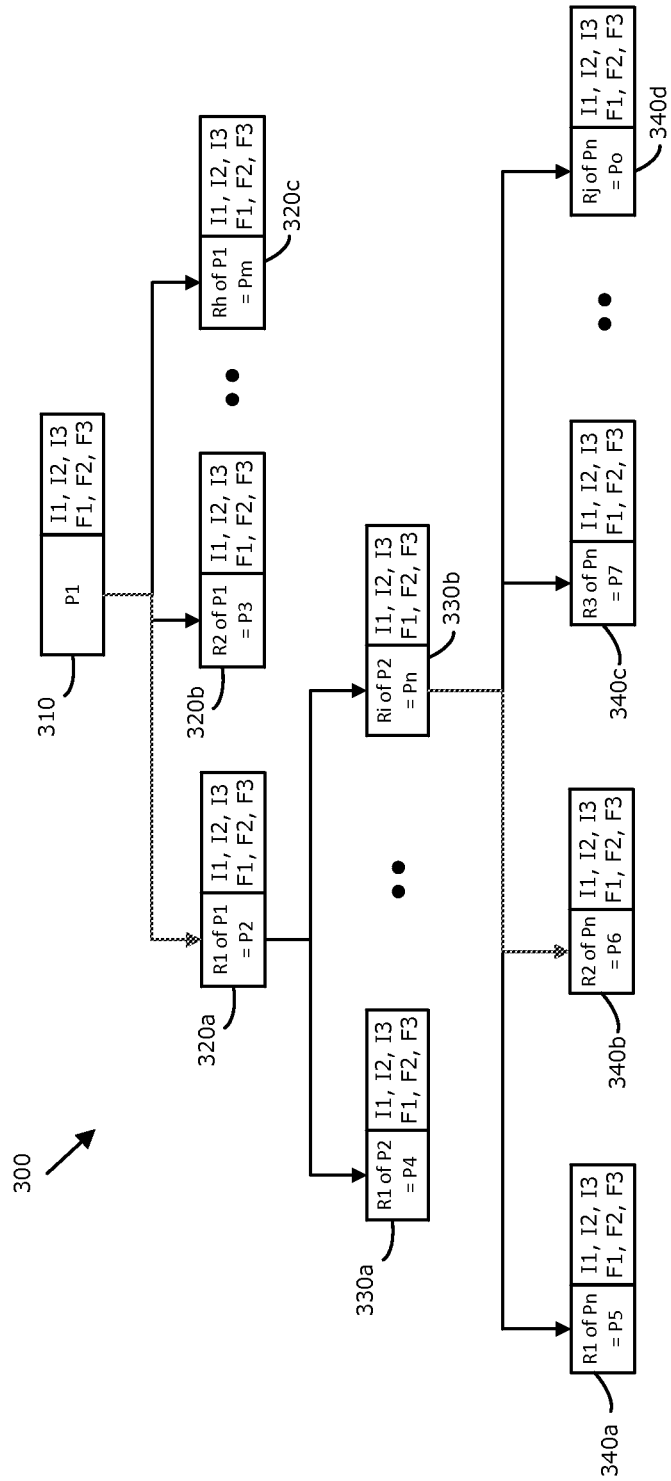
FIG. 3 shows an example tree structure representing one example hierarchy of posts and reposts.

FIG. 3 shows an example tree structure representing one example hierarchy of posts and reposts. Hierarchical or tree structure 300 includes a root 310 and nodes 320a-c, which are children of root 310. Any node can have any number of children. For example, node 320a has children nodes 330a-b, and node 330b has children nodes 340a-d. For simplicity, nodes 320b-c and 330a are not shown with any children. Tree structure 300 can have any number of levels of nodes, and four levels are illustrated.

Each node shows a post P1-P7, Pm, Pn, or Po. A post, except the one at the root node 310, is a repost of a parent post. For example post P2 320a is a repost R1 of the root post P1 310. Each node (e.g., each post) is illustrated with input controls I1-I3 (e.g., "+1", "Comment", and "Share" controls 115-117, FIG. 1) and feedback data F1-F3 (e.g., feedback data 125-127, FIG. 1). Three input controls are illustrated but any number of input controls can be implemented along corresponding or non-corresponding number of feedback data.

In some example embodiments, feedback provided at a node is propagated to a parent node, to the parent node above that, and to the parent node above that, and so on, up to the root node 310. For example, feedback provided using the I2 control of node 340c is updated (e.g., incorporated) with feedback data F2 of node 340c, propagated up to F2 of node 330b, propagated up to F2 of node 320a, then propagated to root node 310. In other example embodiments, the feedback propagation up the tree is subject to privacy or other settings of the user at node 340c and/or any of the nodes 330b, 320a, and 310.

In some example embodiments, feedback, regardless of which level it originates from, is only propagated to the original post, e.g., to P1 at root node 310. Referring back to FIG. 1, for example, all feedback in these embodiments is propagated only to Alice's post 114, view 110.

Example Processes

Figure 4:
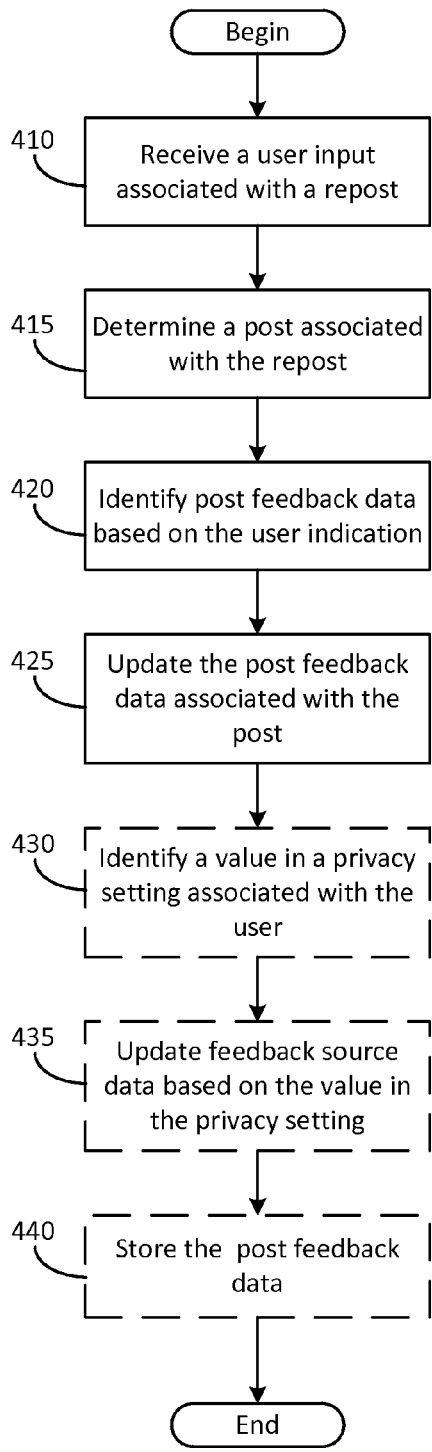
FIG. 4 shows an example process implementing at least one example embodiment.

FIG. 4 shows an example process implementing at least one example embodiment. A user's input (e.g., user indication) associated with a repost is received (410). For example, Charlie's input using a "+1" control 135 associated with repost 134 is received. Charlie's input may be an endorsement using a "+1" control 135, a comment using a "Comment" control 136 (e.g., Charlie provides a comment on post 114 or 134), a repost input using a "Share" control 137 (e.g., Charlie re-shares Alice's post 114), or another type of input (not shown). Alice's post 114 is determined or identified to be associated with repost 134 (415). Post feedback data 125 is determined or identified based on Charlie's input using a "+1" control (420). Three post feedback data 125-127 are identified associated with Alice's post 114, and post feedback data 125 is identified to be associated with a "+1" control. If feedback is provided using a "Comment" control 116, 136, or 156, post feedback data 127 associated with Alice's post 114 is identified. If feedback is provided using a "Share" control 117, 137, or 157, post feedback data 126 associated with Alice's post 114 is identified.

The identified post feedback data associated with Alice's post is updated based on the feedback (425). In some example embodiments where feedback is represented by a value (e.g., "1" or any number), updating the post feedback data involves adding the value to the post feedback data. The post feedback data represent previous feedback, which can be zero or empty if there is no previous feedback. In other example embodiments, updating the post feedback data can be performed differently based on the representation of the feedback and post feedback data (e.g., updating by incorporating, appending, concatenating, averaging, retaining a maximum or minimum value, or by other calculation, computation, or manipulation).

In some example embodiments, the identity of the user (e.g., Charlie) who has provided feedback is recorded or indicated on Alice's post. The identity may be shown, for example, using a feedback data control (e.g., one of controls 128-129 and feedback data 125-127 serving as feedback data controls, described above). A feedback data control may be associated with an underlying feedback source data (not shown). For example, clicking on a feedback data control 129 will trigger a display of a list of identities, stored in a corresponding feedback source data, of users who have provided comments using a "Comment" control 116, 136, or 156. There may be one feedback source data associated with each post feedback data 125-127.

In some example embodiments, one or more settings (e.g., privacy settings) of the user (e.g., Charlie) may be checked to determine whether to propagate the user's identity (e.g., Charlie's identity) to Alice's post. For example, a setting may be provided to Charlie for him to indicate whether he wants his identity to be propagated with his feedback (e.g., using a "+1," "Comment," or "Share" control).

In some example embodiments, a setting may be provided for each type of feedback (e.g., a setting associated with each of post feedback data 125-127). For example, a setting for the comment type of feedback may be a name-value pair of "Propagate my identity with my comments: 1/0," where the value of "1" indicates propagating and "0" indicates not propagating. When Charlie provides a comment (e.g., using a "Comment" control 136), the value in a privacy setting (e.g., "Propagate my identity with my comments" setting) is identified (430). The feedback source data associated with comment feedback is updated based on the identified value (435). If the value is "1," the feedback source data is updated to include Charlie's identity. If the value is "0," the feedback source data is not updated or updated to ensure Charlie's identity is not included. The updated post feedback data and/or the updated feedback source data may be stored (430).

In some example embodiments, the above process may be implemented with more, fewer, or different procedures. For example, the execution in one or more of blocks 430-440 may be omitted.

Figure 5:
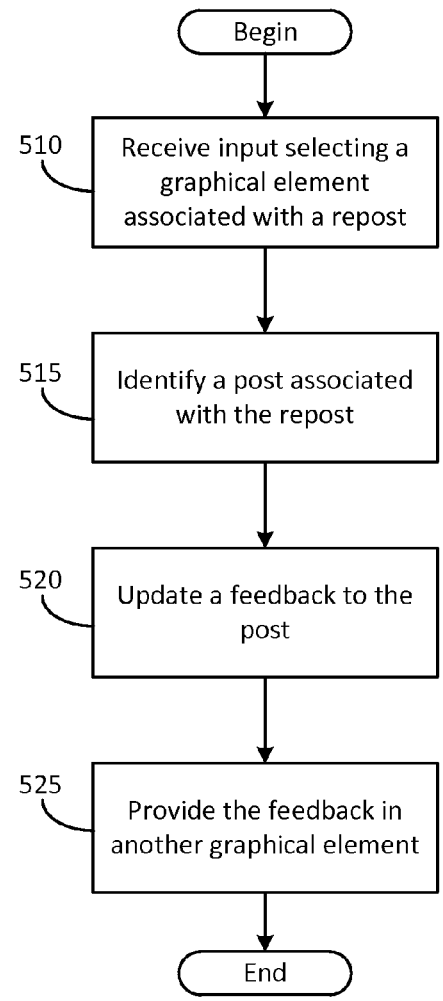
FIG. 5 shows another example process implementing at least one example embodiment involving user interface elements.

FIG. 5 shows another example process implementing at least one example embodiment involving user interface elements. A user interface is provided (e.g., display 110, 130, or 150, FIG. 1) that includes one or more item provide on a website and one or more interface controls or user interface (UI) elements. For example, view 130 (FIG. 1) is provided by services provider 180 and displayed on a computing device (not shown). Feedback or input selecting or activating a "+1" UI element 135, "Comment" UI element 136, or "Share" UI element 137 associated with a repost 134 is received (510). Repost 134 includes at least one item (e.g., Alice's information 112, repost information 113, at least a portion of post 114, and/or comment 131) provide on a website. The item can be the post 114 itself, part of the post, information representing the post (e.g., a link to the post), or the like. Post 134 is identified or determined to be a repost of post 114, which means post 114 is associated with repost 134 (515). In some example embodiments, an association between a post and repost may be maintained (e.g., the association stored with the post and/or repost). Post 114 is updated with the feedback, e.g., updating feedback data 125, 126, or 127 (520).

Feedback data 125, 126, and 127 are identified because they are associated with post 114. Which one of feedback data 125, 126, and 127 to update is identified based on the control used in providing the user input or feedback. In some example embodiments, the updated feedback is stored. The updated feedback, e.g., feedback data 125, is provided to be displayed using another UI element (525), e.g., feedback data 125. A UI element can be graphical, textual, or in another form. In some example embodiments, the above process may be implemented with more, fewer, or different procedures.

Example Computing Devices and Environments

Figure 6:
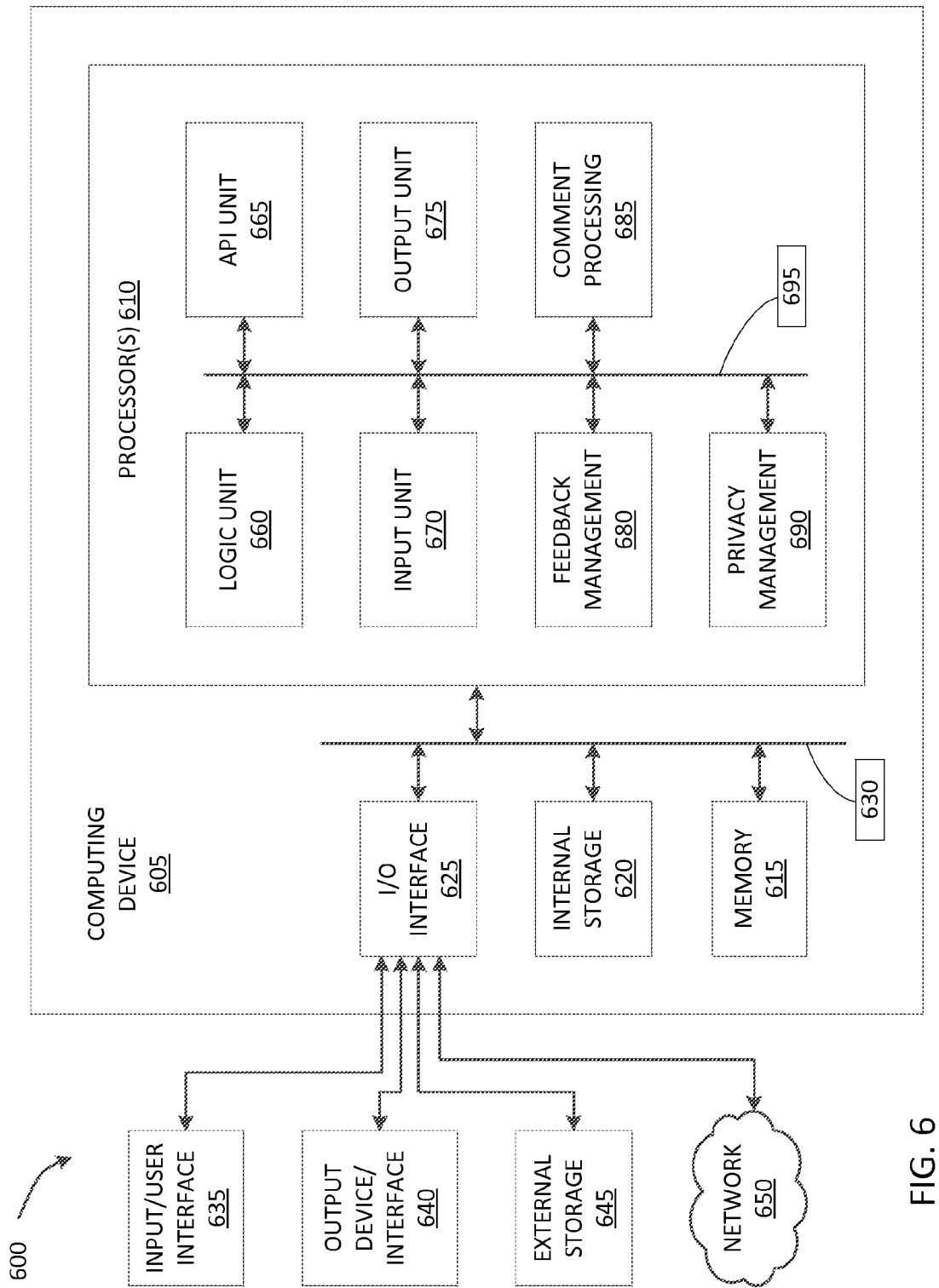
FIG. 6 shows an example computing environment with an example computing device suitable for implementing at least one example embodiment.

FIG. 6 shows an example computing environment with an example computing device suitable for implementing at least one example embodiment. Computing device 605 in computing environment 600 can include one or more processing units, cores, or processors 610, memory 615 (e.g., RAM or ROM), internal storage 620 (e.g., magnetic, optical, or solid state storage), and I/O interface 625, all of which can be coupled on a communication mechanism or bus 630 for communicating information.

Computing device 605 can be communicatively coupled to input/user interface 635 and output device/interface 640. Either one or both of input/user interface 635 and output device/interface 640 can be wired or wireless interface and can be detachable. Input/user interface 635 includes any device, component, sensor, or interface, physical or virtual, that can be used to provide input (e.g., keyboard, a pointing/cursor control, microphone, camera, braille, motion sensor, optical reader, or the like). Output device/interface 640 includes a display, monitor, printer, speaker, braille, or the like. In some example embodiments, input/user interface 635 and output device/interface 640 can be embedded with or physically coupled to computing device 605 (e.g., a mobile computing device with buttons or touch-screen input/user interface and an output or printing display, or a television).

Computing device 605 can be communicatively coupled to external storage 645 and network 650 for communicating with any number of networked components, devices, and systems, including one or more computing devices of same or different configuration. Computing device 605 or any connected computing device can be functioning as, providing services of, or referred to as a server, client, thin server, general machine, special-purpose machine, or by other label.

I/O interface 625 can include, but is not limited to, wired and/or wireless interfaces using any communication or I/O protocols or standards (e.g., Ethernet, 802.11x, Universal System Bus, WiMax, modem, a cellular network protocol, and the like) for communicating information to and/or from at least all the connected components, devices, and network in computing environment 600. Network 650 can be any network or combination of networks (e.g., the Internet, local area network, wide area network, a telephonic network, a cellular network, satellite network, and the like).

Computing device 605 can use and/or communicate using computer-usable or computer-readable media, including transitory media and non-transitory media. Transitory media include transmission media (e.g., metal cables, fiber optics), signals, carrier waves, and the like. Non-transitory media include magnetic media (e.g., disks and tapes), optical media (e.g., CD ROM, digital video disks, Blu-ray disks), solid state media (e.g., RAM, ROM, flash memory, solid-state storage), and other non-volatile storage or memory.

Computing device 605 can be used to implement techniques, methods, applications, processes, or computer-executable instructions to implement at least one embodiment (e.g., a described embodiment). Computer-executable instructions can be retrieved from transitory media, and stored on and retrieved from non-transitory media. The executable instructions can be originated from one or more of any programming, scripting, and machine languages (e.g., C, C++, C#, Java, Visual Basic, Python, Perl, JavaScript, and others).

Processor(s) 610 can execute under any operating system (OS) (not shown), in a native or virtual environment. To implement a described embodiment, one or more applications can be deployed that include logic unit 660, application programming interface (API) unit 665, input unit 670, output unit 675, feedback management unit 680, comment processing unit 685, privacy management unit 690, and inter-unit communication mechanism 695 for the different units to communicate with each other, with the OS, and with other applications (not shown). For example, feedback management unit 680, comment processing unit 685, and privacy management unit 690 may implement one or more processes shown in FIGS. 2, 4, and 5. The described units and elements can be varied in design, function, configuration, or implementation and are not limited to the descriptions provided.

In some example embodiments, when information or an execution instruction is received by API unit 665, it may be communicated to one or more other units (e.g., logic unit 660, input unit 670, output unit 675, feedback management unit 680, comment processing unit 685, and privacy management unit 690). For example, after input unit 670 has detected a user indication or feedback, input unit 670 may use API unit 665 to communicate the user indication to feedback management unit 680. Feedback management unit 680 may, via API unit 665, interact with the comment processing unit 685 to detect and process a comment. Using API unit 665, feedback management unit 680 may interact with privacy management unit 690 to determine whether to propagate the feedback and/or identify information to an upstream post.

In some examples, logic unit 660 may be configured to control the information flow among the units and direct the services provided by API unit 665, input unit 670, output unit 675, settings management unit 680, settings mapping unit 685, and privacy management unit 690 in order to implement an embodiment described above. For example, the flow of one or more processes or implementations may be controlled by logic unit 660 alone or in conjunction with API unit 665.

Although a few example embodiments have been shown and described, these example embodiments are provided to convey the subject matter described herein to people who are familiar with this field. It should be understood that the subject matter described herein may be embodied in various forms without being limited to the described example embodiments. The subject matter described herein can be practiced without those specifically defined or described matters or with other or different elements or matters not described. It will be appreciated by those familiar with this field that changes may be made in these example embodiments without departing from the subject matter described herein as defined in the appended claims and their equivalents.

What is claimed is:

1. A computer-implemented method, comprising:
receiving, using one or more computing devices, from a third user, feedback on repost content posted by a second user;
determining, using the one or more computing devices, that the repost content posted by the second user is associated with post content posted by a first user;
identifying, using the one or more computing devices, feedback data associated with the post content, wherein the feedback data represents previous feedback; and updating, using the one or more computing devices, the feedback data to incorporate the feedback on the repost content, when the third user and the first user are within a threshold number of social steps of each other.

2. The method of claim 1, further comprising providing the feedback data for display on a website.

3. The method of claim 1, wherein the post content is provided on one part on a website, the repost content comprises at least a portion of the post content, and the repost content is provided on another part of the website or on another website.

4. The method of claim 1, wherein the post content and the repost content form a tree structure, wherein the post content is a parent or grandparent of the repost content.

5. The method of claim 4, wherein the feedback on the repost content is propagated up the tree structure to a level where the post content resides and the previous feedback comprises aggregation of feedback associated with at least one of the post content and at least one repost content at one or more levels lower than the level where the post content resides.

6. The method of claim 1, wherein the feedback on the repost content is of one of a plurality of types of feedback, each of the plurality of types of feedback is associated with a corresponding one of a plurality of feedback data associated with the post content, wherein the identifying the feedback data comprises:
   identifying the one of the plurality of types of feedback; and
   identifying the feedback data as one of the plurality of feedback data corresponding to the identified one of the plurality of types of feedback.

7. The method of claim 6, wherein the feedback on the repost content comprises an indication associated with activating a "+1" control.

8. The method of claim 6, wherein the feedback on the repost content comprises an indication associated with activating a "Share" control or "Comment" control.

9. The method of claim 1, further comprising storing an association of the post content and the repost content, wherein the association identifies the post content associated with the repost content.

10. The method of claim 1, wherein the feedback data is numerical data, the feedback on the repost content is represented by a numeric value, and updating the feedback data to incorporate the feedback comprises adding the numeric value to the feedback data.

11. The method of claim 1, further comprising determining a type of comment data, wherein the repost content further comprises the comment data, and wherein the updating the feedback data is performed if the type of comment data is of a positive type.

12. The method of claim 11, wherein the determining the type of the comment data comprises using a natural language processing algorithm to process the comment data.

13. The method of claim 11, wherein the determining the type of the comment data comprises matching the comment data with at least one text string.

14. The method of claim 1, further comprising updating a source data to incorporate an identity of the third user who provided the feedback on the repost content, wherein the source data is associated with the feedback data and the source data represents zero or more identities of users who have provided the previous feedback.

15. The method of claim 14, further comprising determining a privacy setting, wherein the updating the source data is based on the privacy setting.

16. The method of claim 14, further comprising determining a privacy setting of the third user who provided the feedback on the repost content, wherein the updating the source data is performed based on the privacy setting that indicates sharing the identity of the third user.

17. The method of claim 14, further comprising determining a privacy setting of the third user who provided the feedback on the repost content, wherein the updating the source data is not performed based on the privacy setting that indicates hiding the identity of the third user.

18. The method of claim 14, wherein the feedback on the repost content is of one of a plurality of types of feedback, each of the plurality of types of feedback is associated with a corresponding one of a plurality of source data associated with the post content, wherein the updating the source data comprises:
   identifying the one of the plurality of types of feedback; and
   identifying the source data as one of the plurality of source data corresponding to the identified one of the plurality of types of feedback.

19. The method of claim 1, wherein the updating the feedback data is performed based on determining a user setting allowing the updating, and the feedback on the repost content and the user setting are associated with the third user.

20. A non-transitory computer readable medium having stored therein computer executable instructions for:
   receiving, using one or more computing devices, from a third user, feedback on repost content by a second user;
   determining, using the one or more computing devices, that the repost content posted by the second user is associated with post content posted by a first user to at least one user identified by the first user to receive the post content;
   identifying, using the one or more computing devices, feedback data associated with the post content, the feedback data represents previous feedback; and
   updating, using the one or more computing devices, the feedback data to incorporate the feedback on the repost content, when the third user and the first user are within a threshold number of social steps of each other.

21. At least one computing device collectively having storage and at least one processor configured to perform:
   receiving, using one or more computing devices, from a third user, feedback on repost content by a second user;
   determining, using the one or more computing devices, that the repost content posted by the second user is associated with post content posted by a first user to at least one user identified by the first user to receive the post content;
   identifying, using the one or more computing devices, feedback data associated with the post content, the feedback data represents previous feedback; and
   updating, using the one or more computing devices, the feedback data to incorporate the feedback on the repost content, when the third user and the first user are within a threshold number of social steps of each other.

22. A computer-implemented method, comprising:
   receiving, from a third user via a first user interface (UI) element, feedback on a repost by a second user with a second UI element representing the repost;
   identifying that a post by a first user is associated with the repost by the second user, wherein the post is posted to at least one user identified by the first user to receive the post, and the repost comprises at least a portion of the post, a link to access the post, or both;

updating feedback data associated with the post based on the feedback on the repost, when the third user and the first user are within a threshold number of social steps of each other; and providing a third UI element representing the feedback data and a fourth UI element representing the post.

23. The method of claim 22, further comprising:

determining that the feedback on the repost is a comment; and determining a type of the comment, wherein the updating is not performed if the type is not a positive type.

24. The method of claim 22, further comprising:

determining a privacy setting configured to affect updating a feedback source;

wherein the feedback source is updated to include an identity of the third user, who provided the feedback on the repost, if the privacy setting contains a value, and wherein the feedback source is not updated if the privacy setting does not contain the value.

25. The method of claim 22, further comprising a fifth UI element associated with the third UI element, wherein the fifth UI element is configured to trigger a presentation of additional information associated with the feedback data.

26. The method of claim 25, further comprising providing a list of identities of users who have provided the feedback data, wherein the list of identities is triggered by the activation of the fifth UI element.

* * * * *